(12) United States Patent
Liu et al.

(10) Patent No.: US 10,462,827 B2
(45) Date of Patent: Oct. 29, 2019

(54) RANDOM ACCESS METHOD AND APPARATUS

(71) Applicant: Huawei Technologies Co., Ltd., Shenzhen (CN)

(72) Inventors: Jing Liu, Shanghai (CN); Qinghai Zeng, Shanghai (CN); Jian Zhang, Shenzhen (CN); Qufang Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 76 days.

(21) Appl. No.: 15/893,429

(22) Filed: Feb. 9, 2018

(65) Prior Publication Data

US 2018/0167971 A1 Jun. 14, 2018

Related U.S. Application Data

(63) Continuation of application No. PCT/CN2015/086502, filed on Aug. 10, 2015.

(51) Int. Cl.
*H04W 74/08* (2009.01)
*H04W 16/14* (2009.01)
*H04W 74/00* (2009.01)

(52) U.S. Cl.
CPC ......... *H04W 74/085* (2013.01); *H04W 16/14* (2013.01); *H04W 74/006* (2013.01); *H04W 74/08* (2013.01)

(58) Field of Classification Search
CPC ... H04W 16/14; H04W 74/006; H04W 74/08; H04W 74/085; H04W 72/04;
(Continued)

(56) References Cited

U.S. PATENT DOCUMENTS

2016/0227571 A1* 8/2016 Baek .................. H04W 16/14
2016/0295611 A1* 10/2016 Yin ...................... H04L 5/00
(Continued)

FOREIGN PATENT DOCUMENTS

CN 103826318 A 5/2014
CN 104301273 A 1/2015
(Continued)

OTHER PUBLICATIONS

ZTE, "Analysis on potential issues and solutions for LAA UL transmission," 3GPP TSG RAN WG1 Ad-hoc Meeting, R1-151027, 2.2, Mar. 24-26, 2015, 6 pages, Paris, France.

*Primary Examiner* — Robert J Lopata
(74) *Attorney, Agent, or Firm* — Slater Matsil, LLP

(57) ABSTRACT

Embodiments of the present invention provide a random access method which includes: obtaining, by a user equipment, first information, where the first information indicates that a subframe of a physical random access channel (PRACH) resource is a subframe available for use after a licensed-assisted access (LAA) cell successfully preempts a channel, and the PRACH resource is allocated by a first base station serving the LAA cell for user equipments to access the LAA cell in a random access procedure; receiving, by the user equipment, a first indication sent by the first base station, where the first indication indicates that the LAA cell has successfully preempted a channel; and initiating, by the user equipment, the random access procedure according to the first information after receiving the first indication.

20 Claims, 9 Drawing Sheets

(58) Field of Classification Search
CPC .... H04W 72/12; H04W 76/00; H04B 7/2121; H04B 7/2123; H04J 2203/0069; H04Q 2213/394
USPC .......................................................... 370/329
See application file for complete search history.

(56) References Cited

U.S. PATENT DOCUMENTS

| | | | |
|---|---|---|---|
| 2016/0337997 A1* | 11/2016 | Huang | H04L 7/04 |
| 2017/0006626 A1 | 1/2017 | Lin et al. | |
| 2017/0006641 A1* | 1/2017 | Dinan | H04W 74/0833 |
| 2017/0048891 A1* | 2/2017 | Quan | H04W 48/16 |
| 2017/0111889 A1* | 4/2017 | Li | H04W 74/08 |
| 2017/0280331 A1 | 9/2017 | Gou et al. | |
| 2017/0303220 A1* | 10/2017 | Sadeghi | H04L 5/0053 |
| 2018/0020485 A1* | 1/2018 | Yang | H04W 74/08 |
| 2018/0035311 A1* | 2/2018 | Yang | H04W 16/32 |
| 2018/0048498 A1* | 2/2018 | Stern-Berkowitz | H04L 5/0048 |
| 2018/0070375 A1* | 3/2018 | Xu | H04L 5/0048 |
| 2018/0102880 A1* | 4/2018 | Xu | H04L 1/18 |
| 2018/0145736 A1* | 5/2018 | Li | H04B 7/0626 |
| 2018/0206129 A1* | 7/2018 | Choi | H04L 1/00 |
| 2018/0213563 A1* | 7/2018 | Yang | H04W 74/0808 |

FOREIGN PATENT DOCUMENTS

| | | |
|---|---|---|
| CN | 104796920 A | 7/2015 |
| WO | 2012135998 A1 | 10/2012 |

\* cited by examiner

RANDOM ACCESS METHOD AND APPARATUS

CROSS-REFERENCE TO RELATED APPLICATIONS

This application is a continuation of International Application No. PCT/CN2015/086502, filed on Aug. 10, 2015. The disclosure of the aforementioned application is hereby incorporated by reference in its entirety.

TECHNICAL FIELD

Embodiments of the present invention relate to the communications field, and in particular, to a random access method and an apparatus.

BACKGROUND

In an LTE (Long Term Evolution) system, data may be sent by means of channel sharing. For uplink data, an eNB (evolved Node Bastation, or evolved NodeB) may allocate an uplink transmission resource to user equipment. Only a user equipment (UE) that receives an uplink scheduling grant can send uplink data. That is, a UE cannot send data if the UE does not receive an uplink scheduling grant.

3GPP (3rd Generation Partnership Project) has introduced an LAA (License Assisted Access, licensed-assisted access or non-licensed spectrum) cell. This cell uses a non-licensed spectrum.

An LAA cell uses a non-licensed spectrum. When data transmission is performed in the LAA cell, a data transmission resource may no longer be obtained by using an eNB scheduling scheme. Instead, the data transmission resource may be obtained by means of channel preemption. That is, a base station that serves the LAA cell performs energy detection on a channel that is corresponding to the non-licensed spectrum, to determine whether the channel is idle. If the channel is idle, the LAA cell preempts the channel. In this case, the channel can only be used for data transmission in the LAA cell for a given period of time, and after this period of time, the LAA cell releases the channel. Once the LAA cell preempts the channel, the base station that serves the LAA cell informs UEs in the LAA cell about the preemption.

When a data transmission resource of an LAA cell is obtained by means of channel preemption, and a channel can only be preempted for a period of time, a PRACH (Physical Random Access Channel,) time-frequency resource allocated by an eNB during a process in which a UE randomly accesses the LAA cell may become unavailable due to that the LAA cell fails to preempt a channel or a period of time in which a preempted channel is allowed for use has expired.

SUMMARY

Embodiments of the present invention provide a random access method and an apparatus, to solve a problem that a PRACH time-frequency resource allocated by an eNB is unavailable in a process in which UE randomly accesses an LAA cell, because the LAA cell fails to preempt a channel or a period of time in which a preempted channel is allowed for use has expired.

To achieve the foregoing objective, the following technical solutions are used in the embodiments of the present invention.

According to a first aspect, an embodiment of the present invention provides a random access method. The random access method includes obtaining, by a user equipment, first information, where the first information is used to indicate that a subframe of a physical random access channel (PRACH) resource for access to a licensed-assisted access (LAA) cell is one of one or more subframes available for use after the LAA cell successfully preempts a channel. The method further includes receiving, by the user equipment, a first indication sent by a first base station, where the first indication is used to indicate that the LAA cell has successfully preempted a channel, and the first base station is a base station that serves the LAA cell; and initiating, by the user equipment, random access according to the first information after receiving the first indication.

In a first possible implementation of the first aspect, the random access method further includes detecting, by the user equipment after receiving the first indication and before initiating random access according to the first information, whether the channel is in an idle state; and initiating, by the user equipment, random access if the channel is in an idle state.

According to the first aspect or the first possible implementation of the first aspect, in a second possible implementation of the first aspect, the obtaining, by user equipment, first information includes receiving, by the user equipment, a system message broadcast by the first base station, where the system message includes at least the first information; and obtaining, by the user equipment, the first information from the system message.

According to the first aspect or the first possible implementation of the first aspect, in a third possible implementation of the first aspect, the obtaining, by user equipment, first information includes receiving, by the user equipment, a radio resource control protocol RRC message that is sent by the first base station or a second base station by using their respective licensed spectrum cells, where the RRC message includes at least the first information; and obtaining, by the user equipment, the first information from the RRC message.

With reference to any one of the first aspect, or the first possible implementation of the first aspect to the third possible implementation of the first aspect, in a fourth possible implementation of the first aspect, the initiating, by the user equipment, random access according to the first information includes sending, by the user equipment, a random access request message to the first base station, where the random access request message includes a random preamble sequence; and receiving, by the user equipment, a first random access response message sent by the first base station, where the first random access response message includes at least second information, and the second information is used to indicate that the subframe of the PRACH resource is one of one or more other subframes available for use after the LAA cell successfully preempts a channel.

With reference to any one of the first aspect, or the first possible implementation of the first aspect to the third possible implementation of the first aspect, in a fifth possible implementation of the first aspect, the initiating, by the user equipment, random access according to the first information includes sending, by the user equipment, a random access request message to the first base station, where the random access request message includes a random preamble sequence, an identity of the user equipment, a buffer status report BSR of the user equipment, and/or uplink data of the user equipment; and receiving, by the user equipment, a first random access response message sent by the first base } station, where the first random access response message includes at least an identity allocated by the first base station to the user equipment, the first random access response message is a message sent by the first base station after a preset time period following reception of the random access request message elapses, and the channel is not available for preemption by another cell within the preset time period.

With reference to any one of the first aspect, or the first possible implementation of the first aspect to the third possible implementation of the first aspect, in a sixth possible implementation of the first aspect, the initiating, by the user equipment, random access according to the first information includes sending, by the user equipment, a random access request message to the first base station, where the random access request message includes a random preamble sequence; receiving, by the user equipment, a first random access response message sent by the first base station; receiving, by the user equipment, a second random access response message sent by the second base station; and determining, by the user equipment, whether the first random access response message and the second random access response message are the same; and if the first random access response message and the second random access response message are the same, performing, by the user equipment, subsequent processing according to the first random access response message or the second random access response message.

With reference to any one of the first aspect, or the first possible implementation of the first aspect to the third possible implementation of the first aspect, in a seventh possible implementation of the first aspect, the initiating, by the user equipment, random access according to the first information includes sending, by the user equipment, a random access request message to the first base station, where the random access request message includes a random preamble sequence; and receiving, by the user equipment, a second random access response message sent by the second base station.

According to a second aspect, an embodiment of the present invention provides a random access method. The random access method includes sending, by a first base station, first information to user equipment, where the first information is used to indicate that a subframe of a physical random access channel (PRACH) resource for access to a licensed-assisted access (LAA) cell is one of one or more subframes available for use after the LAA cell successfully preempts a channel; and sending, by the first base station, a first indication to the user equipment, so that the user equipment initiates random access according to the first information, where the first indication is used to indicate that the LAA cell has successfully preempted a channel, and the first base station is a base station that serves the LAA cell.

In a first possible implementation of the second aspect, the sending, by a first base station, first information to user equipment includes broadcasting, by the first base station, a system message, where the system message includes at least the first information.

In a second possible implementation of the second aspect, the sending, by a first base station, first information to user equipment includes sending, by the first base station, a radio resource control protocol (RRC) message to the user equipment by using a licensed spectrum cell served by the first base station, where the RRC message includes at least the first information.

With reference to any one of the second aspect, or the first possible implementation of the second aspect to the second possible implementation of the second aspect, in a third possible implementation of the second aspect, the method further includes receiving, by the first base station, a random access request message sent by the user equipment, where the random access request message contains a random preamble sequence; and sending, by the first base station, a first random access response message to the user equipment, where the first random access response message includes at least second information, and the second information is used to indicate that the subframe of the PRACH resource is one of one or more other subframes available after the LAA cell successfully preempts a channel.

With reference to any one of the second aspect, or the first possible implementation of the second aspect to the second possible implementation of the second aspect, in a fourth possible implementation of the second aspect, the method further includes receiving, by the first base station, a random access request message sent by the user equipment, where the random access request message includes a random preamble sequence, an identity of the user equipment, a buffer status report (BSR) of the user equipment, and/or uplink data of the user equipment; and sending, by the first base station, a first random access response message to the user equipment, where the first random access response message includes at least an identity allocated by the first base station to the user equipment, and the channel is not available for preemption by another cell within a preset time period.

With reference to any one of the second aspect, or the first possible implementation of the second aspect to the second possible implementation of the second aspect, in a fifth possible implementation of the second aspect, the method further includes receiving, by the first base station, a random access request message sent by the user equipment, where the random access request message contains a random preamble sequence; and sending, by the first base station, a first random access response message to a second base station, so that the second base station forwards the first random access response message to the user equipment.

With reference to any one of the second aspect, or the first possible implementation of the second aspect to the second possible implementation of the second aspect, in a fifth possible implementation of the second aspect, the method further includes receiving, by the first base station, a random access request message sent by the user equipment, where the random access request message includes a random preamble sequence; sending, by the first base station, a first random access response message to a second base station, so that the second base station forwards the first random access response message to the user equipment; and sending, by the first base station, the first random access response message to the user equipment, so that the user equipment performs subsequent processing according to the first random access response message or the first random access response message forwarded by the second base station.

According to a third aspect, an embodiment of the present invention provides a user equipment. The user equipment includes an obtaining unit, configured to obtain first information, where the first information is used to indicate that a subframe of a physical random access channel (PRACH) resource for access to a licensed-assisted access (LAA) cell is one of one or more subframes available after the LAA cell successfully preempts a channel. The user equipment further includes a receiving unit, configured to receive a first indication sent by a first base station, where the first indication is used to indicate that the LAA cell has successfully preempted a channel, and the first base station is a base station that serves the LAA cell. The user equipment also includes a processing unit, configured to, after the receiving unit receives the first indication, initiate random access according to the first information obtained by the obtaining unit.

In a first possible implementation of the third aspect, the processing unit is further configured to, after the receiving unit receives the first indication and before initiating the random access according to the first information obtained by the obtaining unit, detect whether the channel is in an idle state, and to initiate the random access if the channel is in an idle state.

With reference to the third aspect or the first possible implementation of the third aspect, in a second possible implementation of the third aspect, the receiving unit is further configured to receive a system message broadcast by the first base station, where the system message includes at least the first information. The obtaining unit is specifically configured to obtain the first information from the system message received by the receiving unit.

With reference to the third aspect or the first possible implementation of the third aspect, in a third possible implementation of the third aspect, the receiving unit is further configured to receive a radio resource control protocol (RRC) message that is sent by the first base station or a second base station by using their respective licensed spectrum cells, where the RRC message includes at least the first information. The obtaining unit is specifically configured to obtain the first information from the RRC message.

With reference to any one of the third aspect, or the first possible implementation of the third aspect to the third possible implementation of the third aspect, in a fourth possible implementation of the third aspect, the user equipment further includes a sending unit. The sending unit is configured to send a random access request message to the first base station, where the random access request message includes a random preamble sequence. The receiving unit is further configured to receive a first random access response message sent by the first base station, where the first random access response message includes at least second information, and the second information is used to indicate that the subframe of the PRACH resource is one of one or more other subframes available after the LAA cell successfully preempts a channel.

With reference to any one of the third aspect, or the first possible implementation of the third aspect to the third possible implementation of the third aspect, in a fifth possible implementation of the third aspect, the user equipment further includes a sending unit. The sending unit is configured to send a random access request message to the first base station, where the random access request message includes a random preamble sequence, an identity of the user equipment, a buffer status report (BSR) of the user equipment, and/or uplink data of the user equipment. The receiving unit is further configured to receive a first random access response message sent by the first base station, where the first random access response message includes at least an identity allocated by the first base station to the user equipment, the first random access response message is a message sent by the first base station after a preset time period following reception of the random access request message elapses, and the channel is not available for preemption by another cell within the preset time period.

With reference to any one of the third aspect, or the first possible implementation of the third aspect to the third possible implementation of the third aspect, in a sixth possible implementation of the third aspect, the user equipment further includes a sending unit. The sending unit is configured to send a random access request message to the first base station, where the random access request message includes a random preamble sequence. The receiving unit is further configured to receive a first random access response message sent by the first base station, and is further configured to receive a second random access response message sent by the second base station. The processing unit is specifically configured to determine whether the first random access response message and the second random access response message are the same. The processing unit is specifically configured to perform subsequent processing according to the first random access response message or the second random access response message when the first random access response message and the second random access response message are the same.

With reference to any one of the third aspect, or the first possible implementation of the third aspect to the third possible implementation of the third aspect, in a seventh possible implementation of the third aspect, the user equipment further includes a sending unit. The sending unit is configured to send a random access request message to the first base station, where the random access request message includes a random preamble sequence. The receiving unit is further configured to receive a second random access response message sent by the second base station.

According to a fourth aspect, an embodiment of the present invention provides a first base station. The first base station includes a sending unit, configured to send first information to user equipment, where the first information is used to indicate that a subframe of a physical random access channel (PRACH) resource for access to a licensed-assisted access (LAA) cell is one of one or more subframes available after the LAA cell successfully preempts a channel. The sending unit is also configured to send a first indication to the user equipment, so that the user equipment initiates random access according to the first information, where the first indication is used to indicate that the LAA cell has successfully preempted a channel, and the first base station is a base station that serves the LAA cell.

In a first possible implementation of the fourth aspect, the sending unit is specifically configured to broadcast a system message, where the system message includes at least the first information.

In a second possible implementation of the fourth aspect, the sending unit is specifically configured to send a radio resource control protocol (RRC) message to the user equipment by using a licensed spectrum cell served by the first base station, where the RRC message includes at least the first information.

With reference to any one of the fourth aspect, or the first possible implementation of the fourth aspect to the second possible implementation of the fourth aspect, in a third possible implementation of the fourth aspect, the first base station further includes a receiving unit. The receiving unit is configured to receive a random access request message sent by the user equipment, where the random access request message includes a random preamble sequence. The sending unit is further configured to send a first random access response message to the user equipment, where the first random access response message includes at least second information, and the second information is used to indicate that the subframe of the PRACH resource is one of one or more other available subframes after the LAA cell successfully preempts a channel.

With reference to any one of the fourth aspect, or the first possible implementation of the fourth aspect to the second possible implementation of the fourth aspect, in a fourth possible implementation of the fourth aspect, the first base station further includes a receiving unit. The receiving unit is configured to receive a random access request message sent by the user equipment, where the random access request message includes a random preamble sequence, an identity of the user equipment, a buffer status report (BSR) of the user equipment, and/or uplink data of the user equipment. The sending unit is further configured to send a first random access response message to the user equipment, where the first random access response message includes at least an identity allocated by the first base station to the user equipment, and the channel is not available for preemption by another cell within a preset time period.

With reference to any one of the fourth aspect, or the first possible implementation of the fourth aspect to the second possible implementation of the fourth aspect, in a fifth possible implementation of the fourth aspect, the first base station further includes a receiving unit. The receiving unit is configured to receive a random access request message sent by the user equipment, where the random access request message includes a random preamble sequence. The sending unit is further configured to send a first random access response message to a second base station, so that the second base station forwards the first random access response message to the user equipment.

With reference to any one of the fourth aspect, or the first possible implementation of the fourth aspect to the second possible implementation of the fourth aspect, in a sixth possible implementation of the fourth aspect, the first base station further includes a receiving unit. The receiving unit is configured to receive a random access request message sent by the user equipment, where the random access request message includes a random preamble sequence. The sending unit is further configured to send a first random access response message to a second base station, so that the second base station forwards the first random access response message to the user equipment. The sending unit is further configured to send the first random access response message to the user equipment, so that the user equipment performs subsequent processing according to the first random access response message or the first random access response message forwarded by the second base station.

According to a fifth aspect, an embodiment of the present invention provides user equipment. The user equipment includes a processor, configured to obtain first information, where the first information is used to indicate that a subframe of a physical random access channel (PRACH) resource for access to a licensed-assisted access (LAA) cell is one of one or more subframes available after the LAA cell successfully preempts a channel. The user equipment further includes a transceiver, configured to receive a first indication sent by a first base station, where the first indication is used to indicate that the LAA cell has successfully preempted a channel, and the first base station is a base station that serves the LAA cell, where the processor is further configured to initiate random access according to the first information after the transceiver receives the first indication.

In a first possible implementation of the fifth aspect, the processor is further configured to, after the transceiver receives the first indication and before the processor initiates the random access according to the first information, detect whether the channel is in an idle state, and to initiate random access if the channel is in an idle state.

With reference to the fifth aspect or the first possible implementation of the fifth aspect, in a second possible implementation of the fifth aspect, the transceiver is further configured to receive a system message broadcast by the first base station, where the system message includes at least the first information. The processor is further configured to obtain the first information from the system message received by the transceiver.

With reference to the fifth aspect or the first possible implementation of the fifth aspect, in a third possible implementation of the fifth aspect, the transceiver is further configured to receive a radio resource control protocol (RRC) message that is sent by the first base station or a second base station by using their respective licensed spectrum cells, where the RRC message includes at least the first information. The processor is further configured to obtain the first information from the RRC message received by the transceiver.

With reference to any one of the fifth aspect, or the first possible implementation of the fifth aspect to the third possible implementation of the fifth aspect, in a fourth possible implementation of the fifth aspect, the transceiver is further configured to send a random access request message to the first base station, where the random access request message includes a random preamble sequence. The transceiver is further configured to receive a first random access response message sent by the first base station, where the first random access response message includes at least second information, and the second information is used to indicate that the subframe of the PRACH resource is one of one or more other available subframes after the LAA cell successfully preempts a channel.

With reference to any one of the fifth aspect, or the first possible implementation of the fifth aspect to the third possible implementation of the fifth aspect, in a fifth possible implementation of the fifth aspect, the transceiver is configured to send a second random access request message to the first base station, where the second random access request message includes a random preamble sequence, an identity of the user equipment, a buffer status report (BSR) of the user equipment, and/or uplink data of the user equipment. The transceiver is further configured to receive a first random access response message sent by the first base station, where the first random access response message includes at least an identity allocated by the first base station to the user equipment, the first random access response message is a message sent by the first base station after a preset time period following reception of the random access request message elapses, and the channel is not available for preemption by another cell within the preset time period.

With reference to any one of the fifth aspect, or the first possible implementation of the fifth aspect to the third possible implementation of the fifth aspect, in a sixth possible implementation of the fifth aspect, the transceiver is further configured to send a random access request message to the first base station, where the random access request message includes a random preamble sequence. The transceiver is further configured to receive a first random access response message sent by the first base station. The transceiver is further configured to receive a second random access response message sent by the second base station. The processing unit is specifically configured to determine whether the third random access response message and the fourth random access response message are the same, and is specifically configured to, perform subsequent processing according to the first random access response message or the second random access response message when the third random access response message and the fourth random access response message are the same.

With reference to any one of the fifth aspect, or the first possible implementation of the fifth aspect to the third possible implementation of the fifth aspect, in a seventh possible implementation of the fifth aspect, the transceiver is further configured to send a random access request message to the first base station, where the random access request message includes a random preamble sequence. The transceiver is further configured to receive a second random access response message sent by the second base station.

According to a sixth aspect, an embodiment of the present invention provides a first base station. The first base station includes a transceiver, configured to send first information to user equipment, where the first information is used to indicate that a subframe of a physical random access channel (PRACH) resource for access to a licensed-assisted access (LAA) cell is one of one or more available subframes after the LAA cell successfully preempts a channel. The transceiver is further configured to send a first indication to the user equipment, so that the user equipment initiates random access according to the first information, where the first indication is used to indicate that the LAA cell has successfully preempted a channel, and the first base station is a base station that serves the LAA cell.

In a first possible implementation of the sixth aspect, the transceiver is specifically configured to broadcast a system message, where the system message includes at least the first information.

In a second possible implementation of the sixth aspect, the transceiver is specifically configured to send a radio resource control protocol (RRC) message to the user equipment by using a licensed spectrum cell served by the first base station, where the RRC message includes at least the first information.

With reference to any one of the sixth aspect, or the first possible implementation of the sixth aspect to the second possible implementation of the sixth aspect, in a third possible implementation of the sixth aspect, the transceiver is further configured to receive a random access request message sent by the user equipment, where the random access request message includes a random preamble sequence. The transceiver is further configured to send a first random access response message to the user equipment, where the first random access response message includes at least second information, and the second information is used to indicate that the subframe of the PRACH resource is one of one or more other available subframes after the LAA cell successfully preempts a channel.

With reference to any one of the sixth aspect, or the first possible implementation of the sixth aspect to the second possible implementation of the sixth aspect, in a fourth possible implementation of the sixth aspect, the transceiver is further configured to receive a random access request message sent by the user equipment, where the random access request message includes a random preamble sequence, an identity of the user equipment, a buffer status report (BSR) of the user equipment, and/or uplink data of the user equipment. The transceiver is further configured to send a first random access response message to the user equipment, where the first random access response message includes at least an identity allocated by the first base station to the user equipment, and the channel is not available for preemption by another cell within a preset time period.

With reference to any one of the sixth aspect, or the first possible implementation of the sixth aspect to the second possible implementation of the sixth aspect, in a fifth possible implementation of the sixth aspect, the transceiver is further configured to receive a random access request message sent by the user equipment, where the random access request message includes a random preamble sequence. The transceiver is further configured to send a first random access response message to a second base station, so that the second base station forwards the first random access response message to the user equipment.

With reference to any one of the sixth aspect, or the first possible implementation of the sixth aspect to the second possible implementation of the sixth aspect, in a sixth possible implementation of the sixth aspect, the transceiver is further configured to receive a random access request message sent by the user equipment, where the random access request message includes a random preamble sequence. The transceiver is further configured to send a first random access response message to a second base station, so that the second base station forwards the first random access response message to the user equipment. The transceiver is further configured to send the first random access response message to the user equipment, so that the user equipment performs subsequent processing according to the first random access response message or the first random access response message forwarded by the second base station.

The embodiments of the present invention provide the random access method and the apparatus. The user equipment may obtain the first information, and the first information is used to indicate that the subframe of the PRACH resource for access to the licensed-assisted access (LAA) cell is one of one or more available subframes after the LAA cell successfully preempts a channel. After the user equipment receives the first indication that is sent by the LAA cell and used to indicate that the LAA cell has successfully preempted a channel, the user equipment initiates random access according to the first information.

According to the solutions, the user equipment may obtain an indication indicating a subframe that is obtained after the LAA cell preempts a channel and in which a PRACH resource is available. Therefore, when the LAA cell preempts a channel and the first indication is sent to inform the user equipment, the user equipment can clearly know, according to the first information, the subframe in which a PRACH resource is available. In this way, after receiving the first indication indicating that the LAA cell has preempted a channel, the user equipment may initiate, according to the first information, random access by using a PRACH time-frequency resource. This solves a problem that a PRACH time-frequency resource allocated by an eNB is unavailable in a process in which a user equipment randomly accesses an LAA cell. This may be caused by the LAA cell failing to preempt a channel or expiration of a period of time in which a preempted channel is allowed for use.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention.

In the following description, specific details such as a particular system structure, an interface, and a technology are set forth in an illustrative but not a restrictive sense to make a thorough understanding of embodiments of the present invention. However, a person skilled in the art should know that the present invention may be practiced in other embodiments without these specific details. In other cases, detailed descriptions of well-known apparatuses, circuits, and methods are omitted, so that embodiments of the present invention are described without being obscured by unnecessary details.

In addition, the term "and/or" in this disclosure describes only an association relationship for describing associated objects and represents that three relationships may exist. For example, A and/or B may represent the following three cases: Only A exists, both A and B exist, and only B exists. In addition, the character "/" in this disclosure generally indicates an "or" relationship between the associated objects.

Ordinal numbers such as "first" and "second" mentioned in the embodiments of the present invention should be construed as numbers for distinguishing only, unless an order is specifically indicated in a context.

Various technologies described herein may be applied to an LTE (Long Term Evolution) system or an LTE-A (Long Term Evolution-Advanced) system.

A user equipment is a wireless terminal. The wireless terminal may be a device that provides a voice and/or data connectivity to a user, a handheld device having a wireless connection function, or another processing device connected to a wireless modem. The wireless terminal may communicate with one or more core networks by using a radio access network (RAN). The wireless terminal may be a mobile terminal, such as a mobile phone (or referred to as a "cellular" phone) or a computer having a mobile terminal. Specifically, the wireless terminal may be a portable, pocket-sized, or handheld mobile apparatus, a mobile apparatus built in a computer, or a vehicle-mounted mobile apparatus that exchanges voice and/or data with the radio access network. The wireless terminal may also be referred to as a system, a subscriber unit, a subscriber station, a mobile station, a mobile, a remote station, an access point, a remote terminal, an access terminal, a user terminal, a user agent, a user device, or a user equipment.

At present, random access of a user equipment in an LTE system may be categorized to contention-based random access and non-contention based random access.

Figure 1:
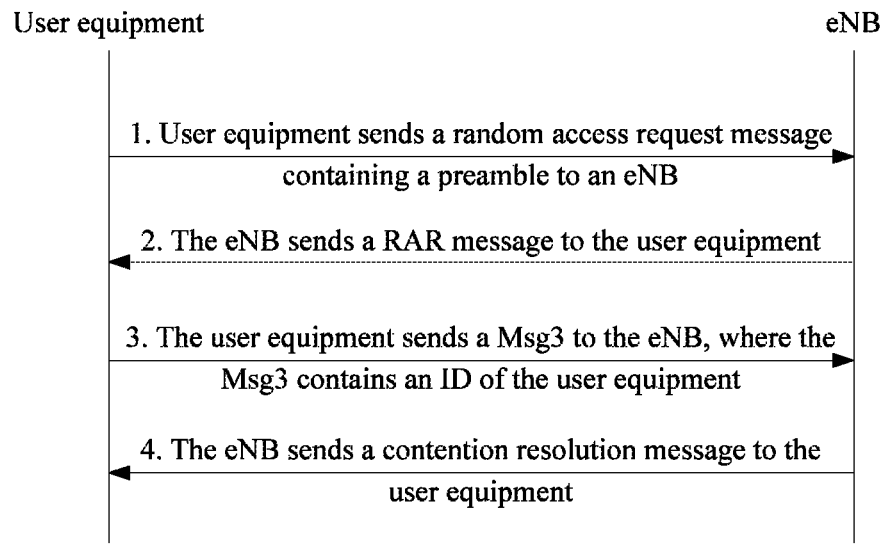
FIG. 1 shows a contention-based random access procedure of a user equipment in an LTE system.

For contention-based random access, a user equipment obtains, e.g., by reading a system message (such as SIB2) broadcast by an eNB, an indication about a PRACH resource for initiating random access in a cell. The PRACH resource may include a PRACH frequency-domain resource and a PRACH time-domain resource. Then, the user equipment may initiate contention-based access over a common PRACH resource specified by the eNB. Specifically, as shown in FIG. 1, a process of the contention-based random access may include the following operations.

1. A user equipment sends a random access request message including a preamble (e.g., a random preamble sequence) to an eNB.

Specifically, the user equipment may send, to the eNB, the preamble over a common PRACH resource specified by the eNB.

2. The eNB sends a RAR (Random Access Response) message to the user equipment.

3. The user equipment sends a $Msg_3$ to the eNB, where the $Msg_3$ includes an ID (Identity) of the user equipment.

4. The eNB sends a contention resolution message to the user equipment.

Figure 2:
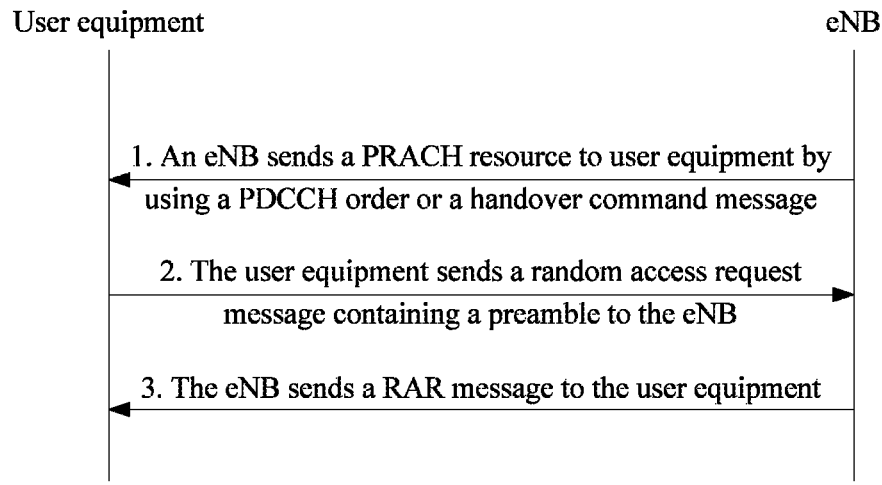
FIG. 2 shows a non-contention based random access procedure of a user equipment in an LTE system.

For non-contention based random access, a user equipment may obtain, by using a PDCCH (Physical Downlink Control Channel) order or a handover command message, a dedicated PRACH resource configured by an eNB. The PRACH resource may include a PRACH frequency-domain resource and a PRACH time-domain resource. Then, the user equipment may initiate the non-contention based access over the dedicated PRACH resource specified by the eNB. Specifically, as shown in FIG. 2, a process of non-contention based random access includes the following operations.

1. An eNB sends a PRACH resource to a user equipment by using a PDCCH order or a handover command message.

2. The user equipment sends a random access request message including a preamble (e.g., a random preamble sequence) to the eNB.

Specifically, the user equipment may send, to the eNB, the preamble over a dedicated PRACH resource specified by the eNB.

3. The eNB sends a RAR message to the user equipment.

No matter in the case of the contention-based random access or the non-contention based random access, the eNB may inform the user equipment of a PRACH time-domain resource by specifying an absolute subframe number.

The various technologies described in the embodiments of the present invention may be applicable to random access initiated by a user equipment in an LAA cell.

Embodiment 1

Figure 3:
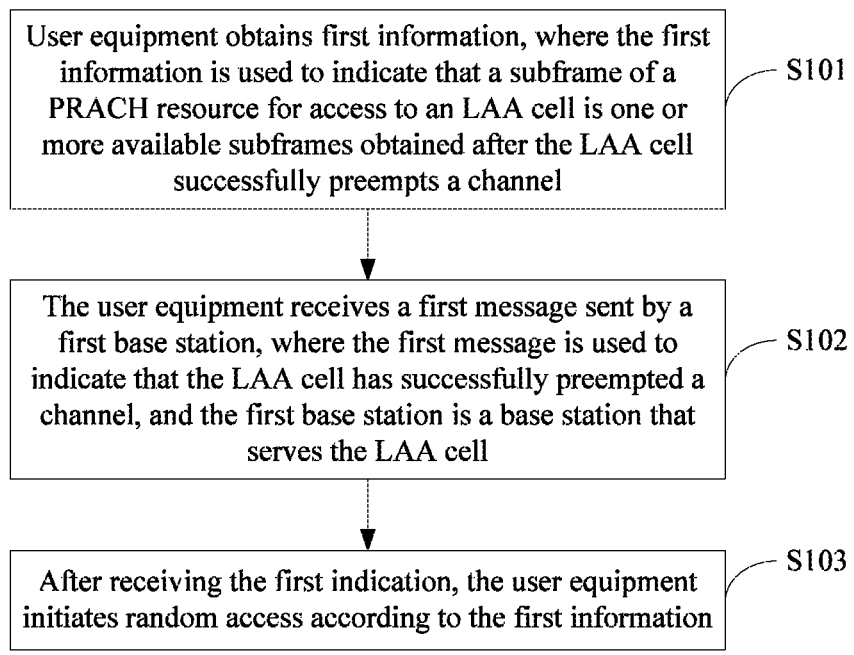
FIG. 3 is a schematic flowchart of a random access method according to an embodiment of the present invention.

This embodiment of the present invention provides a random access method, as shown in FIG. 3, including the following steps.

S101. A user equipment obtains first information, where the first information is used to indicate that a subframe of a PRACH resource for access to an LAA cell is one of one or more subframes available for use after the LAA cell successfully preempts a channel.

S102. The user equipment receives a first indication sent by a first base station, where the first indication is used to indicate that the LAA cell has successfully preempted the channel, and the first base station is a base station that serves the LAA cell.

S103. After receiving the first indication, the user equipment initiates random access according to the first information.

In an LTE system, no matter whether random access of a user equipment is contention-based or not, the user equipment needs to send a preamble to an eNB. However, to send the preamble to the eNB, the user equipment needs to use a PRACH resource specified by the eNB. That is, when performing random access, the user equipment needs to obtain an uplink transmission resource, and then sends the preamble over the uplink transmission resource.

An uplink transmission resource may be obtained by means of channel preemption when data transmission is performed in an LAA cell. When a user equipment randomly accesses the LAA cell, a PRACH resource allocated by an eNB may become unavailable if the LAA cell fails to preempt a channel or a period of time in which a preempted channel is allowed for use has expired.

To ensure that all PRACH resources allocated by the eNB are available, configuration of PRACH resources is extended in this embodiment of the present invention. In this way, when obtaining PRACH resource information, the user equipment can clearly learn which subframe that is available after the LAA cell preempts a channel includes a PRACH resource.

Specifically, the user equipment obtains the first information. The first information is used to indicate that the subframe of the PRACH resource for access to the LAA cell belongs to one or more subframes available for use after the LAA cell successfully preempts a channel.

Optionally, subframes that are available after the LAA cell preempts a channel and that include a PRACH resource may be consecutive subframes, subframes at regular intervals, or irregularly distributed subframes. No specific limitation is set in this embodiment of the present invention.

For example, the first information may indicate that a PRACH resource is available in the first subframe, the third subframe, and the fourth subframe obtained after the LAA cell preempts a channel. The first information may also indicate that a PRACH resource is available in the first subframe, the third subframe, and the fifth subframe obtained after the LAA cell preempts a channel. In another example, the first information may indicate that a PRACH resource is available in the second subframe, the third subframe, and the fourth subframe obtained after the LAA cell preempts a channel.

Optionally, a method for obtaining the first information by the user equipment may include receiving a system message broadcast by the first base station, and obtaining the first information from the system message, where the system message includes at least the first information.

For example, if the user equipment camps on an independent LAA cell, the user equipment may receive a system message (such as SIB2) broadcast by a base station that serves the LAA cell, and obtain the first information from the system message.

It should be noted that the first information in this embodiment of the present invention may be added to the system message in a form of a field, or may be added to the system message in another form. No specific limitation is set in this embodiment of the present invention.

Optionally, a method for obtaining the first information by the user equipment may include receiving an RRC (Radio Resource Control) message that is sent by the first base station or a second base station by using their respective licensed spectrum cells, and obtaining the first information from the RRC message, where the RRC message includes at least the first information.

The RRC message in this embodiment of the present invention may be an RRC reconfiguration message, or may be an RRC message of another type. No specific limitation is set in this embodiment of the present invention.

For example, before the user equipment accesses an LAA cell, the LAA cell may know in advance, from configuration of a licensed spectrum cell (in an ideal backhaul scenario, the licensed spectrum cell may be a primary cell, and in a non-ideal backhaul scenario, the licensed spectrum cell may be a primary cell served by a primary base station), which user equipment is to access the LAA cell. The LAA cell may send the first information to the licensed spectrum cell, and the licensed spectrum cell may then send the first information to the user equipment. In this case, the user equipment may obtain the first information according to the RRC message sent by the licensed spectrum cell.

In an ideal backhaul scenario, the LAA cell and the licensed spectrum cell may be served by a same base station, and the user equipment may receive the RRC message that is sent by the first base station using the licensed spectrum cell that is served by the first base station. In a non-ideal backhaul scenario, the LAA cell and the licensed spectrum cell may not be served by a same base station, and the user equipment may receive the RRC message that is sent by a second base station using the licensed spectrum cell that is served by the second base station.

Similarly, the first information in this embodiment of the present invention may be added to the RRC message in a form of a field, or may be added to the RRC message in another form. No specific limitation is set in this embodiment of the present invention.

When the LAA cell preempts a channel, the first base station sends, to the user equipment, the first indication used to indicate that the LAA cell has successfully preempted a channel, so that the user equipment initiates random access according to the first information.

After receiving the first indication sent by the first base station and before initiating the random access according to the first information, the user equipment may need to detect whether the channel is in an idle state. If the channel is in an idle state, the user equipment may initiate the random access.

The user equipment may detect whether the channel is in an idle state by detecting energy of the channel, or may detect whether the channel is in an idle state by using another prior-art mature technology. No specific limitation is set in this embodiment of the present invention.

The first information obtained by the user equipment may also be used to indicate a subframe that is obtained after the LAA cell preempts a channel and that is used for a DRX (Discontinuous Reception) or SPS (Semi-Persistent Scheduling) operation.

DRX may be used for power saving of the user equipment. For example, the user equipment may listen on a PDCCH (Physical Downlink Control Channel) channel only for a period of time, and go into a sleep state for another period of time without listening on the PDCCH channel, so as to implement power saving for the user equipment. SPS may be used for PDCCH resource saving. For example, in SPS, system resources (including uplink and downlink resources) may be allocated or designated only once using a PDCCH (Physical Downlink Control Channel), and then the user equipment can periodically use a same time-frequency resource repeatedly.

Specifically, after the user equipment obtains the first information used to indicate the subframe that is obtained after the LAA cell preempts a channel and that is used for a DRX or SPS operation, once receiving the indication that the LAA cell has successfully preempted a channel, the user equipment can perform corresponding processing according to configuration of the subframe. In this way, power or PDCCH overheads of the user equipment can be saved.

This embodiment of the present invention provides the random access method. The user equipment obtains the first information, and the first information is used to indicate that the subframe of the PRACH resource for access to the LAA cell is one of the one or more available subframes after the LAA cell successfully preempts the channel. After the user equipment receives the first indication that is sent by the LAA cell and used to indicate that the LAA cell has successfully preempted the channel, the user equipment initiates the random access according to the first information.

According to this solution, what the user equipment obtains is an indication indicating a subframe that is obtained after the LAA cell preempts a channel and in which a PRACH resource is available. Therefore, when the LAA cell preempts the channel and the first indication is sent to inform the user equipment, the user equipment can clearly know, according to the first information, the subframe in which the PRACH resource is available. In this way, after receiving the first indication that the LAA cell has preempted the channel, the user equipment may initiate, according to the first information, random access by using the PRACH time-frequency resource. This solves a problem that a PRACH time-frequency resource allocated by an eNB is unavailable in a process in which a user equipment randomly accesses an LAA cell, due to that the LAA cell fails to preempt the channel or a period of time in which a preempted channel is allowed for use has expired.

Embodiment 2

Figure 4:
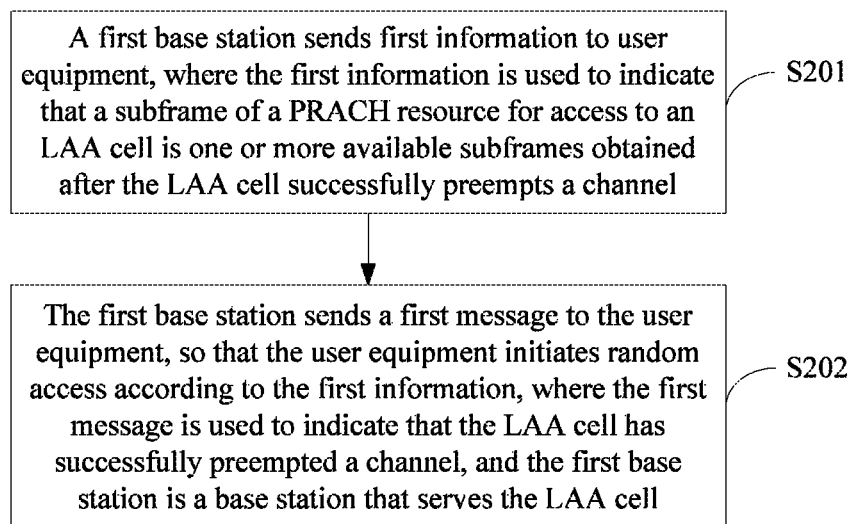
FIG. 4 is a schematic flowchart of another random access method according to an embodiment of the present invention.

This embodiment of the present invention provides a random access method, as shown in FIG. 4, including the following steps.

S201. A first base station sends first information to a user equipment, where the first information is used to indicate that a subframe of a PRACH resource for access to an LAA cell is one of one or more subframes available for use after the LAA cell successfully preempts a channel.

S202. The first base station sends a first indication to the user equipment, so that the user equipment initiates random access according to the first information, where the first indication is used to indicate that the LAA cell has successfully preempted the channel, and the first base station is a base station that serves the LAA cell.

Optionally, subframes that are available after the LAA cell preempts the channel and that include a PRACH resource may be consecutive subframes, subframes at regular intervals, or irregularly distributed subframes. No specific limitation is set in this embodiment of the present invention.

For example, the first information may indicate that a PRACH resource is available in the first subframe, the third subframe, and the fourth subframe obtained after the LAA cell preempts a channel. The first information may also indicate that a PRACH resource is available in the first subframe, the third subframe, and the fifth subframe obtained after the LAA cell preempts a channel. In another example, the first information may indicate that a PRACH resource is available in the second subframe, the third subframe, and the fourth subframe obtained after the LAA cell preempts a channel.

Specifically, a method for sending the first information to the user equipment by the first base station may include sending, by the first base station, a message including the first information to the user equipment; sending, by the first base station, an instruction including the first information to the user equipment; or directly sending, by the first base station, the first information to the user equipment. No specific limitation is set in this embodiment of the present invention.

Optionally, a method for sending, by the first base station, the message including the first information to the user equipment may include broadcasting, by the first base station, a system message, where the system message includes at least the first information.

It should be noted that the first information in this embodiment of the present invention may be added to the system message in a form of a field, or may be added to the system message in another form. No specific limitation is set in this embodiment of the present invention.

Optionally, a method for sending, by the first base station, the message including the first information to the user equipment may include sending, by the first base station, an RRC message by using a licensed spectrum cell served by the first base station, where the RRC message includes at least the first information.

The RRC message in this embodiment of the present invention may be an RRC reconfiguration message, or may be an RRC message of another type. No specific limitation is set in this embodiment of the present invention.

For example, before a user equipment accesses an LAA cell, the LAA cell may know in advance, from configuration of a licensed spectrum cell (in an ideal backhaul scenario, the licensed spectrum cell may be a primary cell), which user equipment is to access the LAA cell. The LAA cell may send the first information to the licensed spectrum cell, and the licensed spectrum cell may send the first information to the user equipment. That is, the user equipment may obtain the first information according to the RRC message sent by the licensed spectrum cell. In an ideal backhaul scenario, the LAA cell and the licensed spectrum cell may be served by a same base station, and the first base station may send the RRC message to the user equipment by using the licensed spectrum cell that is served by the first base station.

Similarly, the first information in this embodiment of the present invention may be added to the RRC message in a form of a field, or may be added to the RRC message in another form. No specific limitation is set in this embodiment of the present invention.

Specifically, when the LAA cell preempts a channel, the first base station sends the first indication to the user equipment, so that the user equipment initiates random access according to the first indication. The first indication is used to indicate that the LAA cell has successfully preempted a channel, and the first base station is the base station that serves the LAA cell.

Similarly, the first information sent by the first base station to the user equipment may further be used to indicate a subframe that is obtained after the LAA cell preempts a channel and that is used for a DRX or SPS operation.

DRX may be for power saving of the user equipment. For example, the user equipment may listen on a PDCCH channel only in a period of time, and go into a sleep state for another period of time without listening on the PDCCH channel, so as to implement power saving for the user equipment. SPS may be for PDCCH resource saving. For example, in SPS, system resources (including uplink and downlink resources) may be allocated or designated only once by using a PDCCH, and then the user equipment can periodically use a same time-frequency resource repeatedly.

Specifically, the first base station sends, to the user equipment, the first information used to indicate the subframe that is obtained after the LAA cell preempts a channel and that is used for a DRX or SPS operation, so that the user equipment can clearly know, according to the first information, which subframe can be used for a DRX or SPS operation. In this way, the user equipment may perform corresponding processing according to the first information. In this way, power or PDCCH overheads of the user equipment can be saved.

This embodiment of the present invention provides the random access method. The first base station sends the first information to the user equipment. The first information is used to indicate that the subframe of the PRACH resource for access to the LAA cell is one of the one or more subframes available for use after the LAA cell successfully preempts the channel. The first base station sends the first indication to the user equipment when the LAA cell served by the first base station successfully preempts the channel, so that the user equipment initiates the random access according to the first information. The first indication is used to indicate that the LAA cell has successfully preempted the channel.

According to this solution, the first information sent by the first base station indicates a subframe that is obtained after the LAA cell preempts a channel and in which a PRACH resource is available. Therefore, when the LAA cell preempts the channel and the first base station sends the first indication to inform the user equipment, the user equipment can clearly know, according to the first information, the subframe in which the PRACH resource is available. In this way, after receiving the first indication that the LAA cell has preempted the channel, the user equipment may initiate, according to the first information, the random access by using the PRACH time-frequency resource. This solves a problem that a PRACH time-frequency resource allocated by an eNB is unavailable in a process in which a user equipment randomly accesses an LAA cell, due to that the LAA cell fails to preempt a channel or a period of time in which a preempted channel is allowed for use has expired.

Embodiment 3

Figure 5:
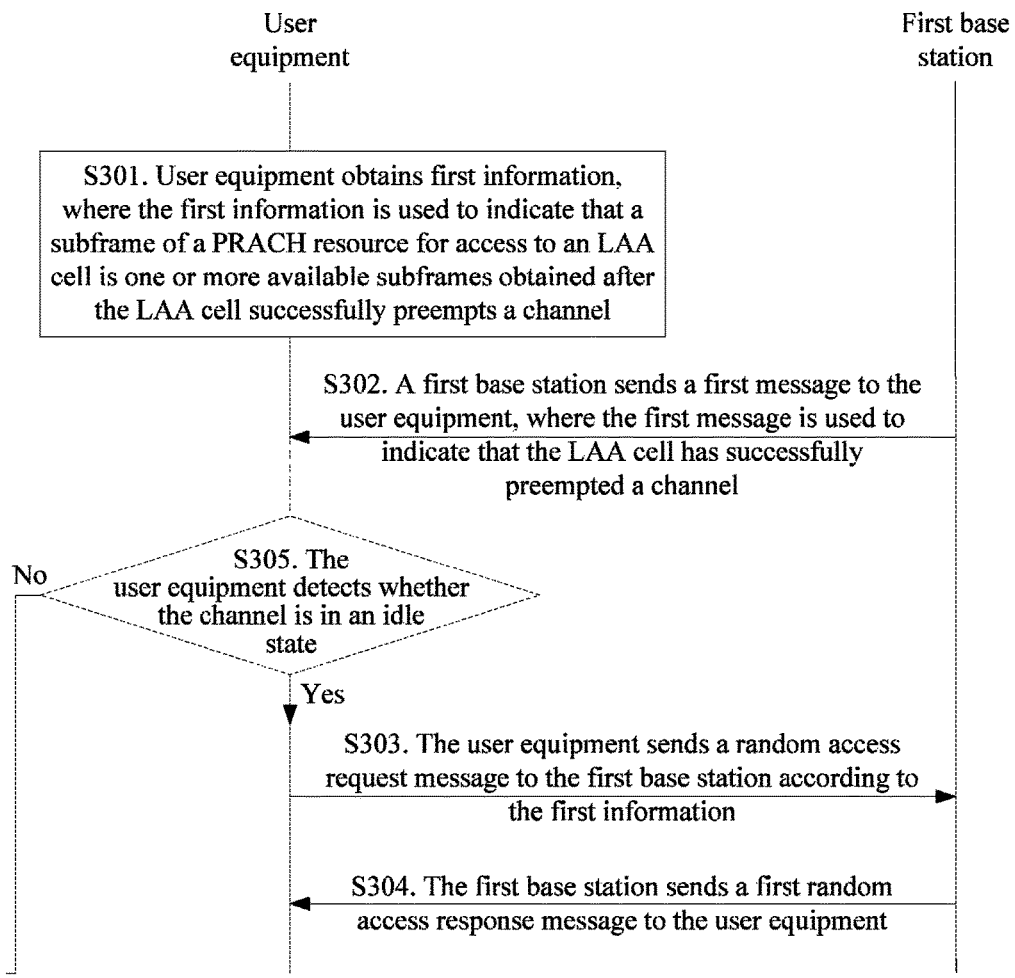
FIG. 5 is a schematic flowchart of yet another random access method according to an embodiment of the present invention.

This embodiment of the present invention provides a random access method, as shown in FIG. 5, including the following steps.

S301. A user equipment obtains first information, where the first information is used to indicate that a subframe of a PRACH resource for access to an LAA cell is one of one or more subframes available after the LAA cell successfully preempts a channel.

S302. A first base station sends a first indication to the user equipment, where the first indication is used to indicate that the LAA cell has successfully preempted the channel.

S303. The user equipment sends a random access request message to the first base station according to the first information.

S304. The first base station sends a first random access response message to the user equipment.

The step of S301 in this embodiment of the present invention is the same as the step of S101 in Embodiment 1, and details are not repeated herein.

An LAA cell uses a non-licensed spectrum. When data transmission is performed in the LAA cell, a data transmission resource may not be obtained by using an eNB scheduling scheme. Instead, the data transmission resource may be obtained by means of channel preemption. Once the LAA cell preempts a channel, a base station that serves the LAA cell informs the user equipment.

Specifically, when the LAA cell preempts a channel, the first base station sends the first indication to the user equipment. The first indication is used to indicate that the subframe of the PRACH resource for access to the LAA cell is one of the one or more subframes available after the LAA cell successfully preempts the channel.

Further, after receiving the first indication, the user equipment sends the random access request message to the first base station according to the first information.

The random access request message is the same as a random access request message sent by a user equipment in a prior-art random access process, and details are not repeated herein.

Further, after receiving the random access request message, the first base station sends the first random access response message to the user equipment according to the random access request message.

The first random access response message in the application scenario is the same as a random access response message received by a user equipment in a prior-art random access process performed in an LAA cell, and details are not repeated herein.

The first information obtained by the user equipment indicates that the subframe of the PRACH resource for access to the LAA cell is one of the one or more available subframes after the LAA cell successfully preempts the channel. Therefore, when the LAA cell preempts the channel and the first base station sends the first indication to inform the user equipment, the user equipment can clearly know, according to the first information, the subframe in which a PRACH resource is available. In this way, after receiving the first indication that the LAA cell has preempted the channel, the user equipment may initiate, according to the first information, the random access by using a PRACH time-frequency resource. This solves a problem that a PRACH time-frequency resource allocated by an eNB is unavailable in a process in which UE randomly accesses an LAA cell, due to that the LAA cell fails to preempt a channel or a period of time in which a preempted channel is allowed for use has expired.

After the user equipment receives the first indication and before the user equipment initiates the random access according to the first information, the user equipment may further detect whether the channel is in an idle state. The user equipment initiates random access if the channel is in an idle state.

Specifically, as shown in FIG. 5, S305 may alternatively be included between S302 and S303. A dashed line in FIG. 5 indicates that S305 is an optional step.

S305. The user equipment detects whether the channel is in an idle state.

Further, to make a user in an access contention collision to be able to re-initiate a random access within a time period for which the channel is preempted by the LAA cell, without waiting for a PRACH resource in a next period, in the random access method provided in this embodiment of the present invention, configuration information of a PRACH resource may be added to a RAR message to indicate a PRACH time-frequency resource for the user who is in an access contention collision. This increases a possibility for the user equipment to perform successful random access.

Figure 6:
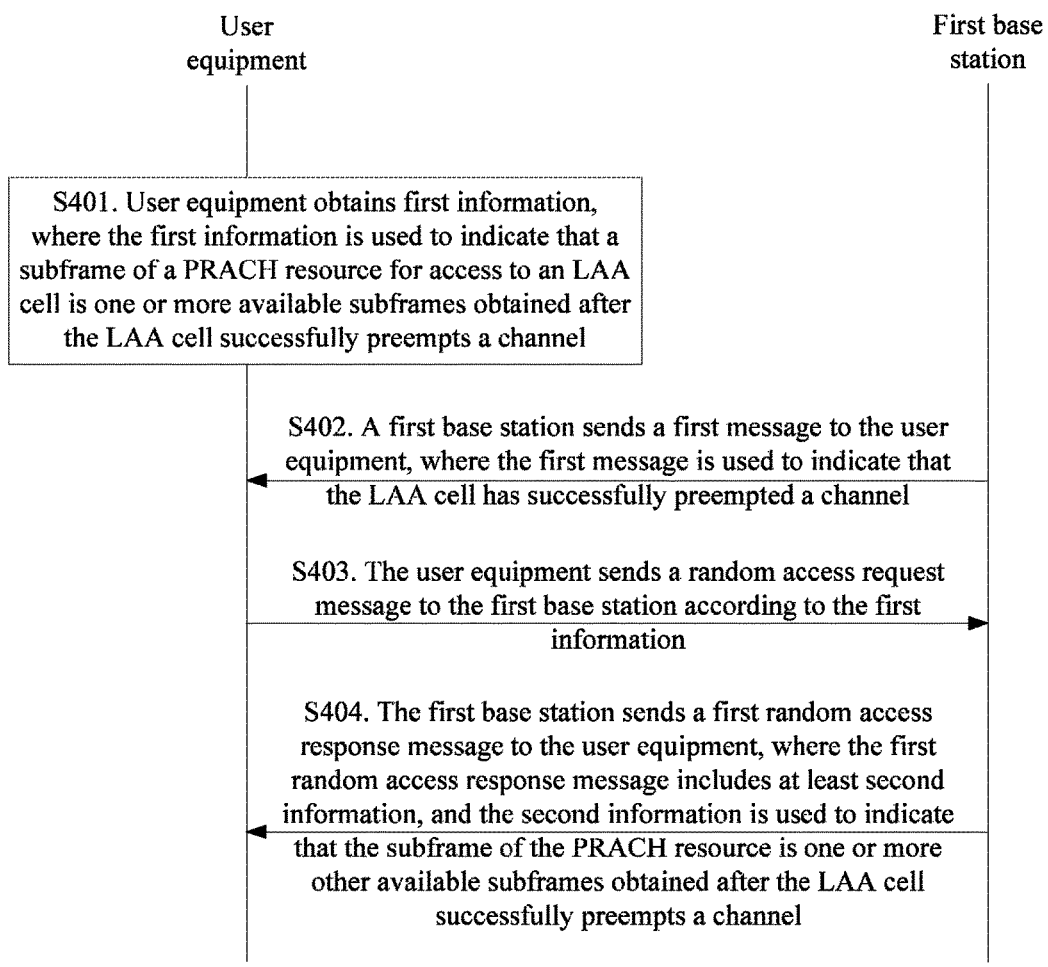
FIG. 6 is a schematic flowchart of yet another random access method according to an embodiment of the present invention.

Specifically, as shown in FIG. 6, a random access method provided in an embodiment of the present invention may include the following steps.

S401. A user equipment obtains first information, where the first information is used to indicate that a subframe of a PRACH resource for access to an LAA cell is one of one or more available subframes after the LAA cell successfully preempts a channel.

S402. A first base station sends a first indication to the user equipment, where the first indication is used to indicate that the LAA cell has successfully preempted the channel.

S403. The user equipment sends a random access request message to the first base station according to the first information.

S404. The first base station sends a first random access response message to the user equipment, where the first random access response message includes at least second information, and the second information is used to indicate that the subframe of the PRACH resource is one of one or more other available subframes after the LAA cell successfully preempts a channel.

In this embodiment of the present invention, S401 is the same as S301, S402 is the same as S302, S403 is the same as S303, and details are not repeated herein.

The first random response message sent by the first base station to the user equipment includes at least the second information, and the second information indicates that the subframe of the PRACH resource is one of the one or more other available subframes after the LAA cell successfully preempts a channel. Therefore, even if the user equipment fails in contention for access in a system, the user equipment can still re-initiate random access according to the second information in the first random response message.

In this embodiment of the present invention, the first random access response message including the second information is sent to the user equipment. This can provide, within the time period for which the channel is preempted by the LAA cell, adequate PRACH time-frequency resources for the user equipment to perform random access. Even if the user equipment fails in contention for access, the user equipment does not have to wait for a PRACH resource in a next period. The user equipment that fails in contention for access can re-initiate access over a PRACH resource indicated in the first random access response message. This increases a possibility for the user equipment to perform successful random access.

When a data transmission resource of an LAA cell is obtained by means of channel preemption and can be preempted for only a period of time, the data transmission resource of the LAA cell may not be reliable. When the data transmission resource of the LAA cell is not reliable, a random access process triggered by a user equipment in the LAA cell may be frequently interrupted.

With the random access method provided in this embodiment of the present invention, the prior-art random access method may be generally optimized, with reduced interruption during a random access process caused by an LAA cell failing to preempt a channel or expiration of a period of time in which a preempted channel is allowed for use.

Figure 7:
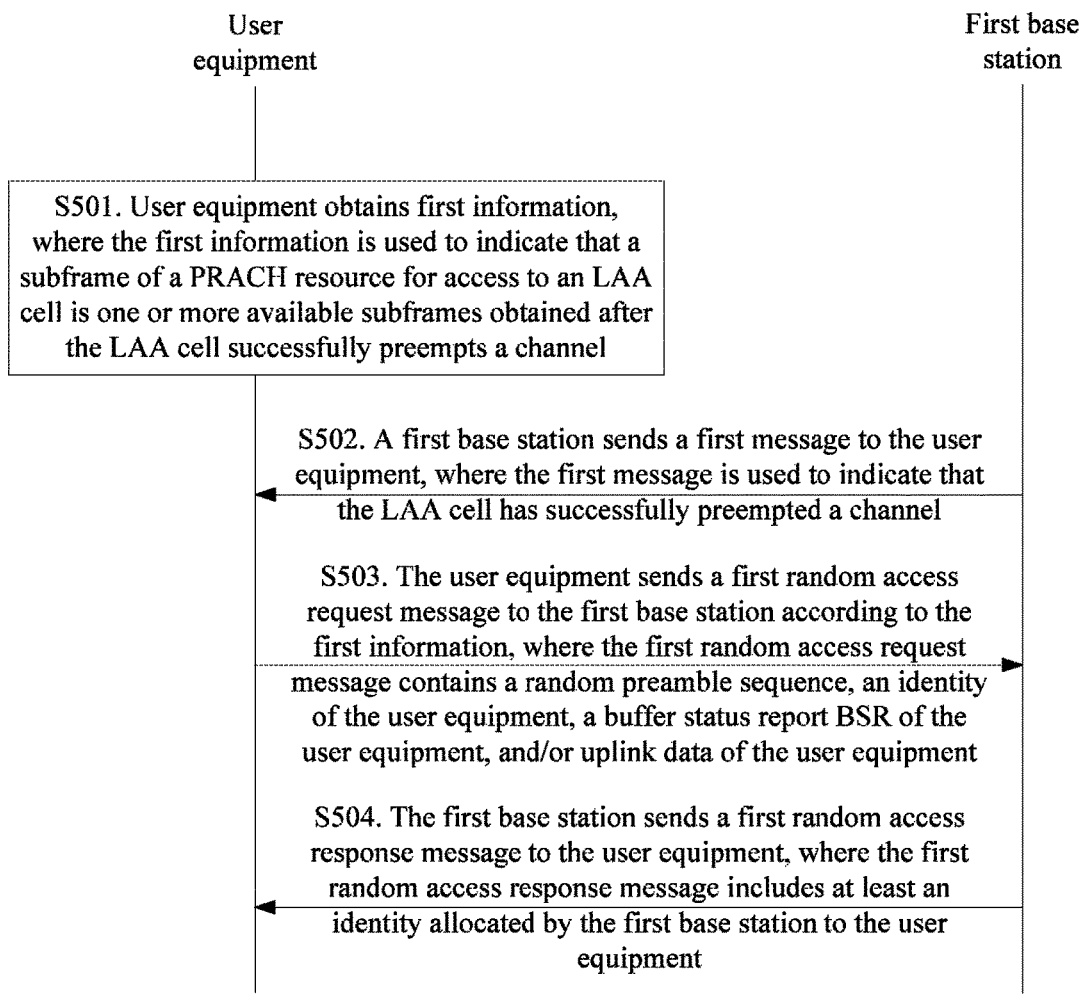
FIG. 7 is a schematic flowchart of yet another random access method according to an embodiment of the present invention.

Specifically, as shown in FIG. 7, a random access method provided in an embodiment of the present invention includes the following steps.

S501. A user equipment obtains first information, where the first information is used to indicate that a subframe of a PRACH resource for access to an LAA cell is one of one or more available subframes after the LAA cell successfully preempts a channel.

S502. A first base station sends a first indication to the user equipment, where the first indication is used to indicate that the LAA cell has successfully preempted the channel.

S503. The user equipment sends a random access request message to the first base station according to the first information, where the random access request message contains a random preamble sequence, an identity of the user equipment, a buffer status report (BSR) of the user equipment, and/or uplink data of the user equipment.

S504. The first base station sends a first random access response message to the user equipment, where the first random access response message includes at least an identity allocated by the first base station to the user equipment.

In this embodiment of the present invention, S501 is the same as S301, S502 is the same as S302, and details are not repeated herein.

In this application scenario, the first random access response message is a message sent by the first base station after a preset time period following reception of the first random access request message elapses. The channel is not available for preemption by another cell within the preset time period. In this way, it can be ensured that the random access process triggered by the user equipment in the LAA cell is not interrupted.

It should be noted that implementation of this application scenario requires that a physical layer mechanism of the first base station that serves the LAA cell be still able to feed back the first random access response message to the user equipment after the preset time period following the reception of the first random access request message elapses.

For example, the preset time period is duration of a short interframe space (SIFS).

Further, a data transmission resource of an LAA cell may not be reliable. Therefore, in a prior-art random access process of a user equipment in the LAA cell, successful transmission of a first random access response message sent by a first base station may not be ensured. As a result, the random access process of the user equipment is frequently interrupted.

To ensure that user equipment can receive a random access response message, and to reduce frequent interruption during the random access process of the user equipment, in a random access method provided in an embodiment of the present invention, a licensed spectrum cell may be used to implement reception of the random access response message by the user equipment.

Figure 8:
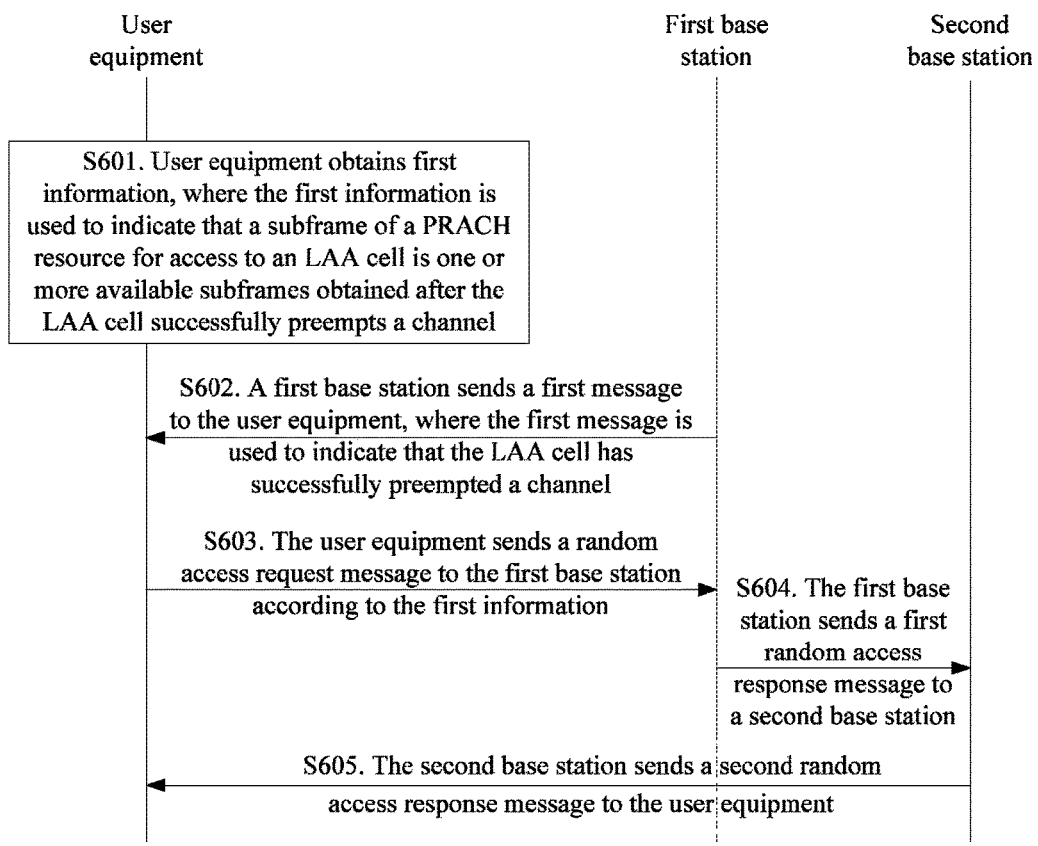
FIG. 8 is a schematic flowchart of yet another random access method according to an embodiment of the present invention.

Specifically, as shown in FIG. 8, a random access method provided in an embodiment of the present invention includes the following steps.

S601. A user equipment obtains first information, where the first information is used to indicate that a subframe of a PRACH resource for access to an LAA cell is one of one or more available subframes after the LAA cell successfully preempts a channel.

S602. A first base station sends a first indication to the user equipment, where the first indication is used to indicate that the LAA cell has successfully preempted the channel.

S603. The user equipment sends a random access request message to the first base station according to the first information.

S604. The first base station sends a first random access response message to a second base station.

S605. The second base station sends a second random access response message to the user equipment.

The second random response message is a message forwarded by the second base station after the second base station receives the first random access response message sent by the first base station.

In this embodiment of the present invention, S601 is the same as S301, S602 is the same as S302, and details are not repeated herein.

It should be noted that in this application scenario, the first base station may be a secondary base station, and the second base station may be a primary base station.

Figure 9:
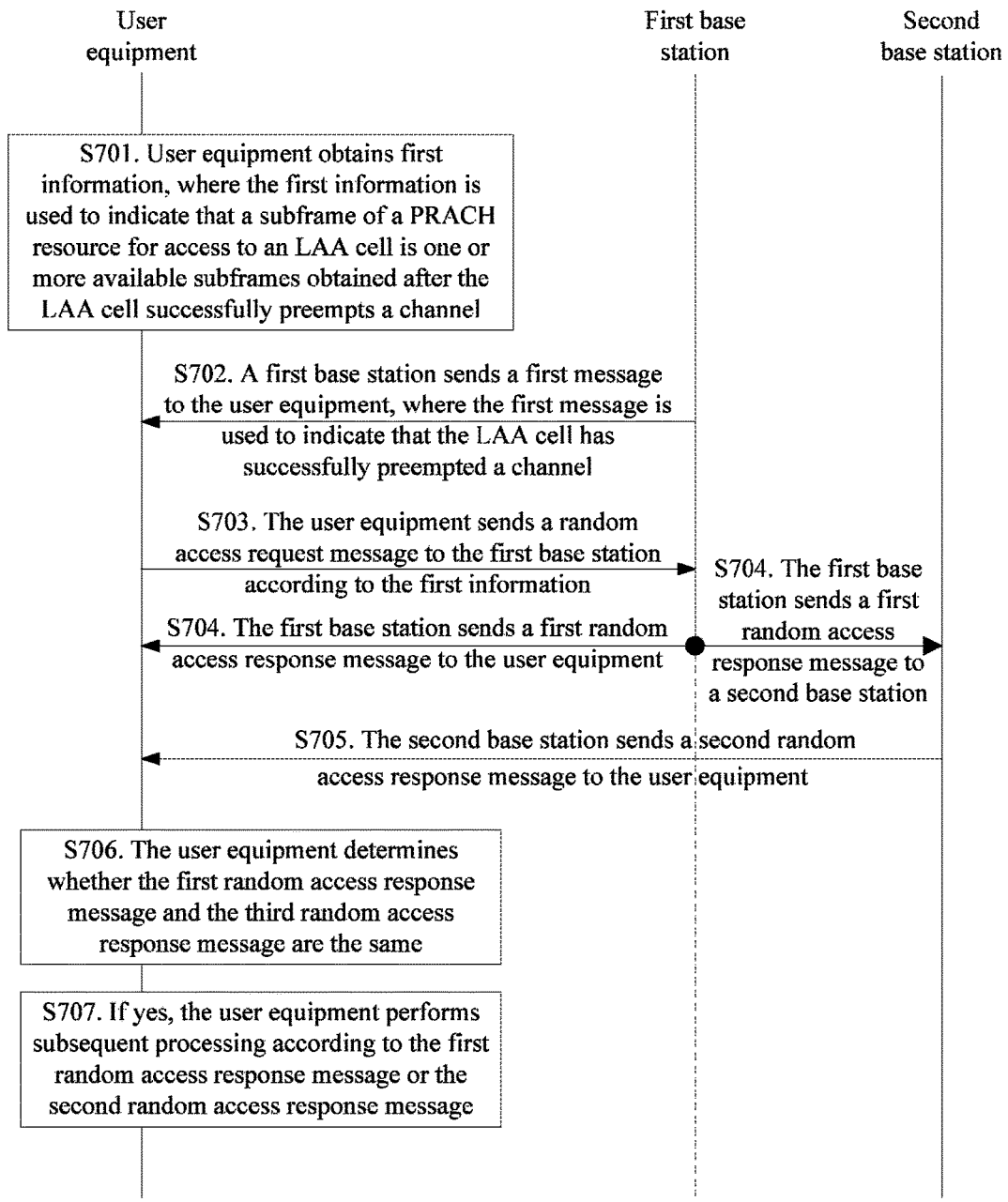
FIG. 9 is a schematic flowchart of yet another random access method according to an embodiment of the present invention.

Alternatively, as shown in FIG. 9, a random access method provided in an embodiment of the present invention includes the following steps.

S701. A user equipment obtains first information, where the first information is used to indicate that a subframe of a PRACH resource for access to an LAA cell is one of one or more subframes available after the LAA cell successfully preempts a channel.

S702. A first base station sends a first indication to the user equipment, where the first indication is used to indicate that the LAA cell has successfully preempted the channel.

S703. The user equipment sends a random access request message to the first base station according to the first information.

S704. The first base station sends a first random access response message to the user equipment and a second base station.

S705. The second base station sends a second random access response message to the user equipment.

The second random response message is a message forwarded by the second base station after the second base station receives the first random access response message sent by the first base station.

S706. The user equipment determines whether the first random access response message and the second random access response message are the same.

S707. If the first random access response message and the second random access response message are the same, the user equipment performs subsequent processing according to the first random access response message or the second random access response message.

In this embodiment of the present invention, S701 is the same as S301, S702 is the same as S302, and details are not repeated herein.

It should be noted that in this application scenario, the first base station may be a secondary base station, and the second base station may be a primary base station.

It should be noted that in this embodiment of the present invention, an execution order of S704 and S705 may be that S704 is executed before S705, may be that S705 is executed before S704, or may be that S704 and S705 are executed simultaneously. No specific limitation is set in this embodiment of the present invention.

In this application scenario, the first random access response message is the same as a prior-art random access response message that is received by a user equipment in an LAA cell in a random access process, and the second random access response message is the same as a prior-art random access response message that is received by a user equipment in an LAA cell in a random access process. Both the first random access response message and the second random access response message include an RA-RNTI (Random Access-Radio Network Temporary).

Specifically, the user equipment may determine whether the first random access response message and the second random access response message are the same by detecting the RA-RNTI (Random Access-Radio Network Temporary).

This embodiment of the present invention provides the random access method. The user equipment obtains the first information. The first information is used to indicate that the subframe of the PRACH resource for access to the LAA cell is one of the one or more subframes available for use after the LAA cell successfully preempts a channel. The first base station sends the first indication to the user equipment when the LAA cell served by the first base station successfully preempts a channel, so that the user equipment initiates random access according to the first information. The first indication is used to indicate that the LAA cell has successfully preempted a channel.

According to this solution, the first information sent by the first base station indicates a subframe that is obtained after the LAA cell preempts the channel and in which a PRACH resource is available. Therefore, when the LAA cell preempts the channel and the first indication is sent to inform the user equipment, the user equipment can clearly know, according to the first information, the subframe in which a PRACH resource is available. In this way, after receiving the first indication that the LAA cell has preempted the channel, the user equipment may initiate, according to the first information, the random access by using a PRACH time-frequency resource. This solves a problem that a PRACH time-frequency resource allocated by an eNB is unavailable in a process in which UE randomly accesses an LAA cell, due to that the LAA cell fails to preempt a channel or a period of time in which a preempted channel is allowed for use has expired.

Embodiment 4

Figure 10:
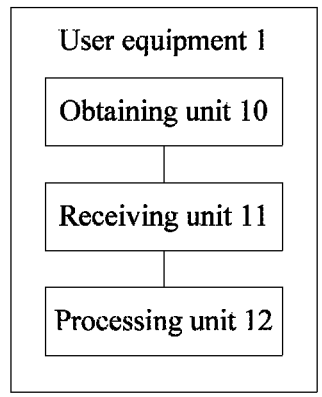
FIG. 10 is a schematic structural diagram of a user equipment according to an embodiment of the present invention.
Figure 11:
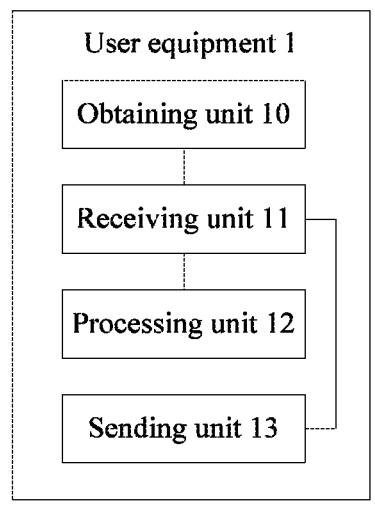
FIG. 11 is a schematic structural diagram of another user equipment according to an embodiment of the present invention.

This embodiment of the present invention provides user equipment 1, as shown in FIG. 10. The user equipment 1 includes an obtaining unit 10, configured to obtain first information, where the first information is used to indicate that a subframe of a physical random access channel (PRACH) resource for access to a licensed-assisted access (LAA) cell is one of one or more subframes available for use after the LAA cell successfully preempts a channel. The user equipment 1 further includes a receiving unit 11, configured to receive a first indication sent by a first base station, where the first indication is used to indicate that the LAA cell has successfully preempted the channel, and the first base station is a base station that serves the LAA cell. The user equipment 1 also includes a processing unit 12, configured to, after the receiving unit 11 receives the first indication, initiate random access according to the first information obtained by the obtaining unit 10.

The processing unit 12 may further be configured to, after the receiving unit 11 receives the first indication and before initiating the random access according to the first information obtained by the obtaining unit 10, detect whether the channel is in an idle state, and to initiate random access according to the first information if the channel is in an idle state.

The receiving unit 11 may further be configured to receive a system message broadcast by the first base station. The system message includes at least the first information.

Further, the obtaining unit 10 may specifically be configured to obtain the first information from the system message received by the receiving unit 11.

The receiving unit 11 may further be configured to receive a radio resource control protocol (RRC) message that is sent by the first base station or a second base station by using their respective licensed spectrum cells. The RRC message includes at least the first information.

Further, the obtaining unit 10 may specifically be configured to obtain the first information from the RRC message.

As shown in FIG. ii, the user equipment 1 may further include a sending unit 13.

The sending unit 13 may be configured to send a random access request message to the first base station. The random access request message may include a random preamble sequence.

The receiving unit 11 may further be configured to receive a first random access response message sent by the first base station. The first random access response message may include at least second information. The second information may be used to indicate that the subframe of the PRACH resource is one of one or more other subframes available for use after the LAA cell successfully preempts the channel.

Further, the sending unit 13 may be configured to send a random access request message to the first base station. The random access request message may include a random preamble sequence, an identity of the user equipment, a buffer status report (BSR) of the user equipment, and/or uplink data of the user equipment.

The receiving unit 11 may further be configured to receive a first random access response message sent by the first base station. The first random access response message may include at least an identity allocated by the first base station to the user equipment. The first random access response message is a message sent by the first base station after a preset time period following reception of the random access request message elapses. The channel is not available for preemption by another cell within the preset time period.

Further, the sending unit 13 may be configured to send a random access request message to the first base station. The random access request message may include a random preamble sequence.

The receiving unit 11 may further be configured to receive a first random access response message sent by the first base station, and to receive a second random access response message sent by the second base station.

Further, the processing unit 12 may specifically be configured to determine whether the first random access response message and the second random access response message are the same. When the first random access response message and the second random access response message are the same, the processing unit 12 may be configured to perform subsequent processing according to the first random access response message or the second random access response message.

Further, the sending unit 13 may be configured to send a random access request message to the first base station. The random access request message may include a random preamble sequence.

The receiving unit 11 may further be configured to receive a second random access response message sent by the second base station.

This embodiment of the present invention provides the user equipment, including the obtaining unit, the receiving unit, and the processing unit. The user equipment obtains the first information. The first information is used to indicate that the subframe of the PRACH resource for access to the licensed-assisted access LAA cell is one of the one or more subframes available for use after the LAA cell successfully preempts the channel. The first base station sends the first indication to the user equipment when the LAA cell served by the first base station successfully preempts the channel, so that the user equipment initiates random access according to the first information. The first indication is used to indicate that the LAA cell has successfully preempted the channel.

According to this solution, the first information sent by the first base station indicates a subframe that is obtained after the LAA cell preempts a channel and in which a PRACH resource is available. Therefore, when the LAA cell preempts the channel and the first indication is sent to inform the user equipment, the user equipment can clearly know, according to the first information, the subframe in which the PRACH resource is available. In this way, after receiving the first indication indicating that the LAA cell has preempted the channel, the user equipment may initiate, according to the first information, the random access by using the PRACH time-frequency resource. This solves a problem that a PRACH time-frequency resource allocated by an eNB is unavailable in a process in which a user equipment randomly accesses an LAA cell, due to that the LAA cell fails to preempt a channel or a period of time in which a preempted channel is allowed for use has expired.

Embodiment 5

Figure 12:
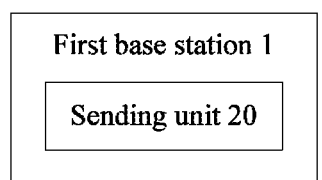
FIG. 12 is a schematic structural diagram of a base station according to an embodiment of the present invention.

This embodiment of the present invention provides a first base station 1, as shown in FIG. 12. The first base station 1 includes a sending unit 20, configured to send a message including first information to a user equipment, where the first information is used to indicate that a subframe of a physical random access channel (PRACH) resource for access to a licensed-assisted access (LAA) cell is one of one or more subframes available for use after the LAA cell successfully preempts a channel; and configured to send a first indication to the user equipment, so that the user equipment initiates random access according to the first information, where the first indication is used to indicate that the LAA cell has successfully preempted the channel, and the first base station is a base station that serves the LAA cell.

Further, the sending unit 20 may specifically be configured to broadcast a system message. The system message includes at least the first information.

Further, the sending unit 20 may specifically be configured to send a radio resource control protocol (RRC) message to the user equipment by using a licensed spectrum cell served by the first base station 1. The RRC message includes at least the first information.

Figure 13:
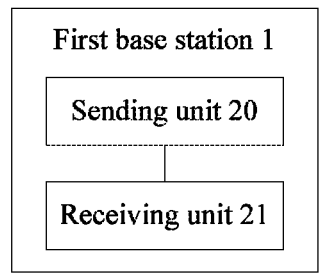
FIG. 13 is a schematic structural diagram of another base station according to an embodiment of the present invention.

As shown in FIG. 13, the first base station 1 may further include a receiving unit 21.

The receiving unit 21 may be configured to receive a random access request message sent by the user equipment. The random access request message includes a random preamble sequence.

The sending unit 20 may further be configured to send a first random access response message to the user equipment. The first random access response message may include at least second information. The second information may be used to indicate that the subframe of the PRACH resource is one of one or more other subframes available for use after the LAA cell successfully preempts the channel.

Further, the receiving unit 21 may be configured to receive a random access request message sent by the user equipment. The random access request message may include a random preamble sequence, an identity of the user equipment, a buffer status report (BSR) of the user equipment, and/or uplink data of the user equipment.

The sending unit 20 may further be configured to send a first random access response message to the user equipment. The first random access response message may include at least an identity allocated by the first base station to the user equipment. The channel is not available for preemption by another cell within a preset time period.

Further, the receiving unit 21 may be configured to receive a random access request message sent by the user equipment. The random access request message may include a random preamble sequence.

The sending unit 20 may further be configured to send a first random access response message to a second base station, so that the second base station forwards the first random access response message to the user equipment.

Further, the receiving unit 21 may be configured to receive a random access request message sent by the user equipment. The random access request message may include a random preamble sequence.

The sending unit 20 may further be configured to send a first random access response message to a second base station, so that the second base station forwards the first random access response message to the user equipment, and to send the first random access response message to the user equipment, so that the user equipment performs subsequent processing according to the first random access response message or the first random access response message forwarded by the second base station.

This embodiment of the present invention provides the first base station that includes the sending unit. The first base station sends the first information to the user equipment. The first information is used to indicate that the subframe of the PRACH resource for access to the licensed-assisted access LAA cell is one of the one or more subframes available for use after the LAA cell successfully preempts a channel. The first base station sends the first indication to the user equipment when the LAA cell served by the first base station successfully preempts the channel, so that the user equipment initiates random access according to the first information. The first indication is used to indicate that the LAA cell has successfully preempted the channel.

According to this solution, the first information sent by the first base station indicates a subframe that is obtained after the LAA cell preempts a channel and in which a PRACH resource is available. Therefore, when the LAA cell preempts the channel and the first base station sends the first indication to inform the user equipment, the user equipment can clearly know, according to the first information, the subframe in which the PRACH resource is available. In this way, after receiving the first indication that the LAA cell has preempted the channel, the user equipment may initiate, according to the first information, random access by using a PRACH time-frequency resource. This solves a problem that a PRACH time-frequency resource allocated by an eNB is unavailable in a process in which a user equipment randomly accesses an LAA cell, due to that the LAA cell fails to preempt a channel or a period of time in which a preempted channel is allowed for use has expired.

Embodiment 6

Figure 14:
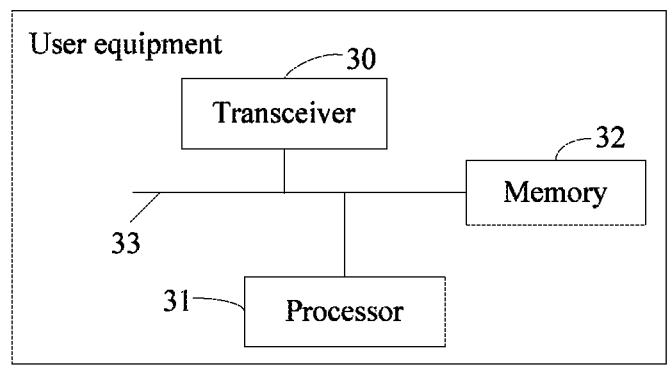
FIG. 14 is a schematic structural diagram of yet another user equipment according to an embodiment of the present invention.

This embodiment of the present invention provides a user equipment. As shown in FIG. 14, the user equipment may include a transceiver 30, a processor 31, a memory 32, and a system bus 33.

The transceiver 30, the processor 31, and the memory 32 are connected by using the system bus 33 to perform communication with each other.

The processor 31 may be a single-core or multi-core central processing unit, an application-specific integrated circuit, or one or more integrated circuits configured to implement this embodiment of the present invention.

The memory 32 may be a high-speed RAM (Random Access Memory) memory or a non-volatile memory, for example, at least one magnetic disk storage.

Specifically, the processor 31 is configured to obtain first information. The first information is used to indicate that a subframe of a physical random access channel (PRACH) resource for access to a licensed-assisted access (LAA) cell is one of one or more subframes available for use after the LAA cell successfully preempts a channel.

Specifically, the transceiver 30 is configured to receive a first indication sent by a first base station. The first indication is used to indicate that the LAA cell has successfully preempted a channel, and the first base station is a base station that serves the LAA cell.

Specifically, the processor 31 may further be configured to initiate random access according to the first information after the transceiver 30 receives the first indication.

The processor 31 may further be configured to, after the transceiver 30 receives the first indication and before initiating the random access according to the first information, detect whether the channel is in an idle state, and initiate the random access according to the first information if the channel is in an idle state.

The transceiver 30 may further be configured to receive a system message broadcast by the first base station. The system message includes at least the first information.

The processor 31 may further be configured to obtain the first information from the system message received by the transceiver 30.

The transceiver 30 may further be configured to receive a radio resource control protocol (RRC) message that is sent by the first base station or a second base station by using their respective licensed spectrum cells. The RRC message includes at least the first information.

The processor 31 may further be configured to obtain the first information from the RRC message received by the transceiver 30.

The transceiver 30 may further be configured to send a random access request message to the first base station, and the random access request message may include a random preamble sequence. The transceiver 30 may further be configured to receive a first random access response message sent by the first base station. The first random access response message may include at least second information. The second information may be used to indicate that the subframe of the PRACH resource is one of one or more other subframes available for use after the LAA cell successfully preempts the channel.

Further, the transceiver 30 may be configured to send a second random access request message to the first base station. The second random access request message may include a random preamble sequence, an identity of the user equipment, a buffer status report (BSR) of the user equipment, and/or uplink data of the user equipment. The transceiver 30 may further be configured to receive a first random access response message sent by the first base station. The first random access response message may include at least an identity allocated by the first base station to the user equipment. The first random access response message is a message sent by the first base station after a preset time period following reception of the random access request message elapses. The channel is not available for preemption by another cell within the preset time period.

The transceiver 30 may further be configured to send a random access request message to the first base station, and the random access request message may include a random preamble sequence. The transceiver 30 may further be configured to receive a first random access response message sent by the first base station, and to receive a second random access response message sent by the second base station.

Further, the processing unit 31 may specifically be configured to determine whether the third random access response message and the fourth random access response message are the same. When the third random access response message and the fourth random access response message are the same, the processing unit 31 may perform subsequent processing according to the first random access response message or the second random access response message.

The transceiver 30 may further be configured to send a random access request message to the first base station, and the random access request message may include a random preamble sequence. The transceiver 30 may further be configured to receive a second random access response message sent by the second base station.

This embodiment of the present invention provides the user equipment. The user equipment obtains the first information. The first information is used to indicate that the subframe of the PRACH resource for access to the LAA cell is one of the one or more subframes available for use after the LAA cell successfully preempts the channel. After the user equipment receives the first indication that is sent by the LAA cell and used to indicate that the LAA cell has successfully preempted the channel, the user equipment initiates random access according to the first information.

According to this solution, what the user equipment obtains is an indication indicating a subframe that is obtained after the LAA cell preempts a channel and in which a PRACH resource is available. Therefore, when the LAA cell preempts the channel and the first indication is sent to inform the user equipment, the user equipment can clearly know, according to the first information, the subframe in which the PRACH resource is available. In this way, after receiving the first indication that the LAA cell has preempted the channel, the user equipment may initiate, according to the first information, the random access by using the PRACH time-frequency resource. This solves a problem that a PRACH time-frequency resource allocated by an eNB is unavailable in a process in which a user equipment randomly accesses an LAA cell, due to that the LAA cell fails to preempt a channel or a period of time in which a preempted channel is allowed for use has expired.

Embodiment 7

Figure 15:
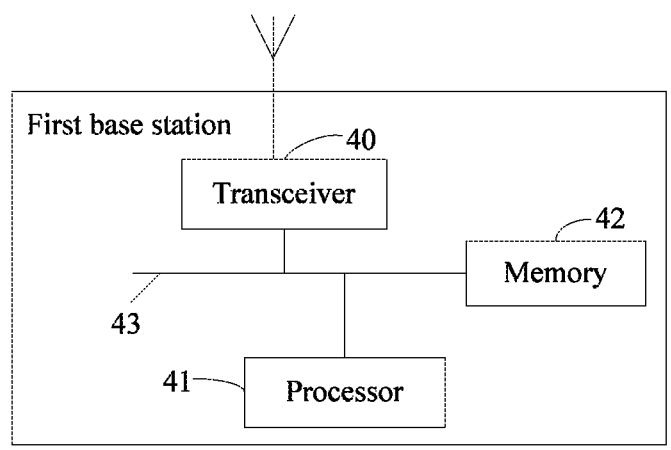
FIG. 15 is a schematic structural diagram of yet another base station according to an embodiment of the present invention.

This embodiment of the present invention provides a first base station. As shown in FIG. 15, the first base station may include a transceiver 40, a processor 41, a memory 42, and a system bus 44.

The transceiver 40, the processor 41, and the memory 42 are connected by using the system bus 44 to perform communication with each other.

The processor 41 may be a single-core or multi-core central processing unit, an application-specific integrated circuit, or one or more integrated circuits configured to implement this embodiment of the present invention.

The memory 42 may be a high-speed RAM memory or a non-volatile memory, for example, at least one magnetic disk storage.

Specifically, the transceiver 400 may be configured to send a message including first information to user equipment. The first information may be used to indicate that a subframe of a physical random access channel (PRACH) resource for access to a licensed-assisted access (LAA) cell is one of one or more subframes available for use after the licensed-assisted access (LAA) cell successfully preempts a channel. In addition, the transceiver 40 may be configured to send a first indication to the user equipment, so that the user equipment initiates random access according to the first information. The first indication is used to indicate that the LAA cell has successfully preempted the channel, and the first base station is a base station that serves the LAA cell.

Further, the transceiver 40 may be specifically configured to broadcast a system message. The system message includes at least the first information.

Further, the transceiver 40 may be specifically configured to send a radio resource control protocol (RRC) message to the user equipment by using a licensed spectrum cell served by the first base station. The RRC message includes at least the first information.

The transceiver 40 may further be configured to receive a random access request message sent by the user equipment, and the random access request message may include a random preamble sequence. The transceiver 40 may further be configured to send a first random access response message to the user equipment. The first random access response message may include at least second information. The second information may be used to indicate that the subframe of the MACH resource belongs to one or more other subframes available for use after the LAA cell successfully preempts a channel.

The transceiver 40 may further be configured to receive a random access request message sent by the user equipment. The random access request message may include a random preamble sequence, an identity of the user equipment, a buffer status report (BSR) of the user equipment, and/or uplink data of the user equipment. The transceiver 40 may further be configured to send a first random access response message to the user equipment. The first random access response message includes at least an identity allocated by the first base station to the user equipment. The channel is not available for preemption by another cell within a preset time period.

The transceiver 40 may further be configured to receive a random access request message sent by the user equipment, and the random access request message may include a random preamble sequence. The transceiver 40 may further be configured to send a first random access response message to a second base station, so that the second base station forwards the first random access response message to the user equipment.

The transceiver 40 may further be configured to receive a random access request message sent by the user equipment, and the random access request message may include a random preamble sequence. The transceiver 40 may further be configured to send a first random access response message to a second base station, so that the second base station forwards the first random access response message to the user equipment. The transceiver 40 may further be configured to send the first random access response message to the user equipment, so that the user equipment performs subsequent processing according to the first random access response message or the first random access response message forwarded by the second base station.

This embodiment of the present invention provides the first base station. The first base station sends the first information to the user equipment. The first information is used to indicate that the subframe of the PRACH resource for access to the LAA cell is one of the one or more subframes available for use after the LAA cell successfully preempts the channel. The first base station sends the first indication to the user equipment when the LAA cell served by the first base station successfully preempts the channel, so that the user equipment initiates random access according to the first information. The first indication is used to indicate that the LAA cell has successfully preempted the channel.

According to this solution, the first information sent by the first base station indicates a subframe that is obtained after the LAA cell preempts a channel and in which a PRACH resource is available. Therefore, when the LAA cell preempts the channel and the first base station sends the first indication to inform the user equipment, the user equipment can clearly know, according to the first information, the subframe in which the PRACH resource is available. In this way, after receiving the first indication that the LAA cell has preempted the channel, the user equipment may initiate, according to the first information, random access by using the PRACH time-frequency resource. This solves a problem that a PRACH time-frequency resource allocated by an eNB is unavailable in a process in which a use equipment randomly accesses an LAA cell, due to that the LAA cell fails to preempt a channel or a period of time in which a preempted channel is allowed for use has expired.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus may be divided into different function modules to implement all or some of the functions described above. For a detailed working process of the foregoing system, apparatus, and unit, references may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections via some interfaces, apparatuses or units, and may be implemented in electronic, mechanical, or other forms.

The units described as separate parts may or may not be physically separate. Parts displayed as units may or may not be physical units, and may be located in one position or distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to execute all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
    obtaining, by a user equipment, first information, wherein the first information indicates that a first subframe of a physical random access channel (PRACH) resource is available for use after a licensed-assisted access (LAA) cell successfully preempts a channel, and wherein the PRACH resource is allocated by a first base station serving the LAA cell for user equipments to access the LAA cell in a random access procedure;
    receiving, by the user equipment, a first indication sent by the first base station, wherein the first indication indicates that the LAA cell has successfully preempted the channel; and
    initiating, by the user equipment, the random access procedure for accessing the LAA cell according to the first information after receiving the first indication.

2. The method according to claim 1, further comprising:
    detecting, by the user equipment after receiving the first indication and before initiating the random access procedure according to the first information, whether the channel is in an idle state; and
    initiating, by the user equipment, the random access procedure when the channel is in the idle state.

3. The method according to claim 1, wherein initiating, by the user equipment, the random access procedure according to the first information comprises:
    sending, by the user equipment, a random access request message to the first base station, wherein the random access request message comprises a random preamble sequence; and receiving, by the user equipment, a first random access response message sent by the first base station, wherein the first random access response message comprises at least second information, and the second information indicates that the first subframe of the PRACH resource is another subframe available for use after the LAA cell successfully preempts the channel.

4. The method according to claim 1, wherein initiating, by the user equipment, the random access procedure according to the first information comprises:
   sending, by the user equipment, a random access request message to the first base station, wherein the random access request message comprises a random preamble sequence, an identity of the user equipment, a buffer status report (BSR) of the user equipment, or uplink data of the user equipment; and
   receiving, by the user equipment, a first random access response message sent by the first base station, wherein the first random access response message comprises at least an identity allocated by the first base station to the user equipment, the first random access response message is a message sent by the first base station after a preset time period following reception of the random access request message elapses, and the channel is not available for preemption by another cell within the preset time period.

5. The method according to claim 1, wherein initiating, by the user equipment, the random access procedure according to the first information comprises:
   sending, by the user equipment, a random access request message to the first base station, wherein the random access request message comprises a random preamble sequence; and
   receiving, by the user equipment, a first random access response message sent by the first base station;
   receiving, by the user equipment, a second random access response message sent by a second base station; and
   performing, by the user equipment, subsequent processing when the first random access response message and the second random access response message are the same.

6. The method according to claim 1, wherein the first information is broadcast by the first base station.

7. The method according to claim 1, wherein the first information is received in a radio resource control (RRC) message sent by the first base station or a second base station.

8. The method according to claim 1, wherein the first information further indicates that the first subframe is available for use in a discontinuous reception operation or a semi-persistent scheduling operation.

9. The method according to claim 1, wherein initiating, by the user equipment, the random access procedure according to the first information comprises:
   sending a random access request message to the first base station using the first subframe.

10. An apparatus, comprising:
   a processor; and
   a non-transitory computer-readable storage medium storing a program to be executed by the processor, the program including instructions to:
   obtain first information, wherein the first information indicates that a first subframe of a physical random access channel (PRACH) resource is available for use after a licensed-assisted access (LAA) cell successfully preempts a channel, and wherein the PRACH resource is allocated by a first base station serving the LAA cell for user equipments to access the LAA cell in a random access procedure;
   receive a first indication sent by the first base station, wherein the first indication indicates that the LAA cell has successfully preempted the channel; and
   after receiving the first indication, initiate the random access procedure according to the first information obtained.

11. The apparatus according to claim 10, wherein the first information is broadcast by the first base station.

12. The apparatus according to claim 10, wherein the first information is received in a radio resource control (RRC) message sent by the first base station or a second base station.

13. The apparatus according to claim 10, wherein the first information further indicates that the first subframe is available for use in a discontinuous reception operation or a semi-persistent scheduling operation.

14. The apparatus according to claim 10, wherein the program further includes instructions to: after receiving the first indication and before initiating the random access procedure according to the first information, detect whether the channel is in an idle state; and initiate the random access procedure when the channel is in the idle state.

15. The apparatus according to claim 10, wherein the program further includes instructions to:
   send a random access request message to the first base station, wherein the random access request message comprises a random preamble sequence; and
   receive a first random access response message sent by the first base station, wherein the first random access response message comprises at least second information, and the second information indicates that the first subframe of the PRACH resource is another subframe available for use after the LAA cell successfully preempts the channel.

16. The apparatus according to claim 10, wherein the program further includes instructions to:
   send a random access request message to the first base station, wherein the random access request message comprises a random preamble sequence, an identity of a terminal, a buffer status report (BSR) of the terminal, or uplink data of the terminal; and
   receive a first random access response message sent by the first base station, wherein the first random access response message comprises at least an identity allocated by the first base station to the terminal, the first random access response message is a message sent by the first base station after a preset time period following reception of the random access request message elapses, and the channel is not available for preemption by another cell within the preset time period.

17. The apparatus according to claim 10, wherein the program further includes instructions to:
   send a random access request message to the first base station, wherein the random access request message includes a random preamble sequence;
   receive a first random access response message sent by the first base station, and receive a second random access response message sent by a second base station; and
   perform subsequent processing according to the first random access response message or the second random access response message when the first random access response message and the second random access response message are the same.

18. A first base station, comprising:
a processor; and
a non-transitory computer-readable storage medium storing a program to be executed by the processor, the program including instructions to:
send first information to a user equipment, wherein the first information indicates that a subframe of a physical random access channel (PRACH) resource is available for use after a licensed-assisted access (LAA) cell successfully preempts a channel, and wherein the PRACH resource is allocated by the first base station serving the LAA cell for user equipments to access the LAA cell in a random access procedure; and
send a first indication to the user equipment, wherein the first indication indicates that the LAA cell has successfully preempted a channel, and the first indication triggers the user equipment to initiate the random access procedure for accessing the LAA cell.

19. The first base station according to claim 18, wherein the program further includes instructions to:
receive a random access request message sent by the user equipment, wherein the random access request message includes a random preamble sequence; and
send a first random access response message to the user equipment, wherein the first random access response message comprises at least second information, and the second information indicates that the subframe of the PRACH resource is another subframe that is available for use after the LAA cell successfully preempts the channel.

20. The first base station according to claim 18, wherein the program further comprises instructions to:
receive a random access request message sent by the user equipment, wherein the random access request message includes a random preamble sequence, an identity of the user equipment, a buffer status report (BSR) of the user equipment, or uplink data of the user equipment; and
send a first random access response message to the user equipment, wherein the first random access response message comprises at least an identity allocated by the first base station to the user equipment, and the channel is not available for preemption by another cell within a preset period of time.

* * * * *